(12) United States Patent
Berggren et al.

(10) Patent No.: US 12,432,761 B2
(45) Date of Patent: Sep. 30, 2025

(54) METHODS FOR ENABLING COMMUNICATION OF ADDITIONAL DATA, RELATED WIRELESS DEVICES AND RADIO NETWORK NODES

(71) Applicant: Sony Group Corporation, Tokyo (JP)

(72) Inventors: Anders Berggren, Lund (SE); Basuki Priyanto, Lund (SE); Rickard Ljung, Helsingborg (SE); Nafiseh Mazloum, Lund (SE)

(73) Assignee: Sony Group Corporation, Tokyo (JP)

( * ) Notice: Subject to any disclaimer, the term of this patent is extended or adjusted under 35 U.S.C. 154(b) by 382 days.

(21) Appl. No.: 17/422,416

(22) PCT Filed: Jan. 14, 2020

(86) PCT No.: PCT/SE2020/050026
§ 371 (c)(1),
(2) Date: Jul. 12, 2021

(87) PCT Pub. No.: WO2020/167193
PCT Pub. Date: Aug. 20, 2020

(65) Prior Publication Data
US 2022/0124721 A1 Apr. 21, 2022

(30) Foreign Application Priority Data
Feb. 15, 2019 (SE) .................................. 1950183-2

(51) Int. Cl.
*H04W 72/04* (2023.01)
*H04W 24/08* (2009.01)
(Continued)

(52) U.S. Cl.
CPC ........... *H04W 72/53* (2023.01); *H04W 24/08* (2013.01); *H04W 72/1263* (2013.01);
(Continued)

(58) Field of Classification Search
CPC . H04W 72/53; H04W 24/08; H04W 72/1263; H04W 72/21; H04W 72/23; H04W 76/10
See application file for complete search history.

(56) References Cited

U.S. PATENT DOCUMENTS 9,059,822 B2 * 6/2015 Frenne .................. H04L 1/0031
11,818,650 B2 * 11/2023 Wei ........................ H04W 76/27
(Continued)

FOREIGN PATENT DOCUMENTS

ES          2765454 T3 *    6/2020  ............ H04W 72/21
WO    WO-2022154345 A1 *   7/2022  ............ H04W 64/00

OTHER PUBLICATIONS

Kompella et al. U.S. Appl. No. 62/668,738, filed May 8, 2018 (Year: 2018).*

(Continued)

*Primary Examiner* — Wutchung Chu
(74) *Attorney, Agent, or Firm* — Tucker Ellis LLP

(57) ABSTRACT

The present disclosure provides a method performed in a wireless device, for enabling communication of additional data in connection with a pre-allocated uplink data transmission. The method comprising communicating between the wireless device and a radio network node, using one or more resources associated with the pre-allocated uplink data transmission, a data indicator indicating that the additional data is to be communicated. The method comprises communicating the additional data, between the wireless device and the radio network node, based on the communicated data indicator.

19 Claims, 12 Drawing Sheets

(51) Int. Cl.
  *H04W 72/1263* (2023.01)
  *H04W 72/21* (2023.01)
  *H04W 72/23* (2023.01)
  *H04W 72/53* (2023.01)
  *H04W 76/10* (2018.01)

(52) U.S. Cl.
  CPC .......... *H04W 72/21* (2023.01); *H04W 72/23* (2023.01); *H04W 76/10* (2018.02)

(56) References Cited

U.S. PATENT DOCUMENTS

| | | | | |
|---|---|---|---|---|
| 12,302,440 | B2* | 5/2025 | Shrestha | H04L 1/1812 |
| 12,317,325 | B2* | 5/2025 | Lim | H04W 72/1268 |
| 2009/0316593 | A1* | 12/2009 | Wang | H04W 74/0838 |
| | | | | 370/252 |
| 2012/0099452 | A1* | 4/2012 | Dai | H04W 72/1221 |
| | | | | 370/252 |
| 2013/0107722 | A1* | 5/2013 | Huang | H04W 72/51 |
| | | | | 370/241 |
| 2014/0004849 | A1* | 1/2014 | Su | H04W 76/19 |
| | | | | 455/423 |
| 2016/0366704 | A1* | 12/2016 | Lee | H04W 74/0833 |
| 2017/0071010 | A1* | 3/2017 | Lim | H04W 72/21 |
| 2017/0202009 | A1* | 7/2017 | Kim | H04W 72/21 |
| 2017/0208581 | A1* | 7/2017 | Yang | H04L 5/0057 |
| 2017/0367058 | A1* | 12/2017 | Pelletier | H04W 72/0446 |
| 2018/0070383 | A1* | 3/2018 | Fujishiro | H04W 74/0833 |
| 2018/0139729 | A1* | 5/2018 | Zhou | H04W 56/0005 |
| 2018/0192436 | A1 | 7/2018 | Yi | |
| 2018/0227938 | A1* | 8/2018 | Lee | H04L 5/0053 |
| 2018/0255586 | A1* | 9/2018 | Einhaus | H04W 74/002 |
| 2018/0279359 | A1* | 9/2018 | Liu | H04W 72/23 |
| 2018/0332561 | A1* | 11/2018 | Da Silva | H04W 76/27 |
| 2018/0368012 | A1* | 12/2018 | Wei | H04W 24/08 |
| 2019/0223190 | A1* | 7/2019 | Hwang | H04L 1/1861 |
| 2019/0334687 | A1* | 10/2019 | Su | H04L 5/0053 |
| 2019/0349982 | A1* | 11/2019 | Kompella | H04W 72/1268 |
| 2020/0029262 | A1* | 1/2020 | Kim | H04W 24/10 |
| 2020/0053799 | A1* | 2/2020 | Jeon | H04W 74/006 |
| 2020/0100297 | A1* | 3/2020 | Agiwal | H04W 52/365 |
| 2020/0137761 | A1* | 4/2020 | Shih | H04W 76/11 |
| 2020/0236582 | A1* | 7/2020 | Chin | H04W 72/23 |
| 2020/0260345 | A1* | 8/2020 | Phuyal | H04W 36/0079 |
| 2020/0288494 | A1* | 9/2020 | Heo | H04W 72/21 |
| 2021/0243777 | A1* | 8/2021 | Tsai | H04W 74/006 |
| 2021/0410166 | A1* | 12/2021 | Shrestha | H04L 1/1822 |
| 2022/0007391 | A1* | 1/2022 | Höglund | H04W 72/115 |
| 2022/0038997 | A1* | 2/2022 | Höglund | H04W 48/10 |
| 2022/0078872 | A1* | 3/2022 | Shrestha | H04W 68/12 |
| 2022/0104306 | A1* | 3/2022 | Shrestha | H04L 1/1812 |
| 2023/0120096 | A1* | 4/2023 | Kim | H04W 36/305 |
| | | | | 370/329 |
| 2024/0155386 | A1* | 5/2024 | Maamari | H04W 28/0205 |

OTHER PUBLICATIONS

Phuyal et al. U.S. Appl. No. 62/803,372, filed Feb. 8, 2019 (Year: 2019).*
Shih et al. U.S. Appl. No. 62/753,318, filed Oct. 31, 2018 (Year: 2018).*
Shrestha et al. U.S. Appl. No. 62/805,162, filed Feb. 13, 2019 (Year: 2019).*
Swedish Search Report from corresponding Swedish Application No. 1950183-2, Aug. 1, 2019, 2 pages.
Ericsson, "Transmission in preconfigured uplink resources," 3GPP TSG-RAN WG2 #104, R2-1816644; Nov. 12-16, 2018, 9 pages.
Huawei, "Uplink transmission in dedicated pre-configured resources," 3GPP TSG-RAN WG2 #104, R2-1816401, Nov. 12-16, 2018, 5 pages.
International Search Report from corresponding International Application No. PCT/SE2020/050026, Apr. 30, 2020, 3 pages.
Zte, "Support for transmission in preconfigured UL resources for NB-IoT," 3GPP TSG RAN WG1 Meeting #95, R1-1812774, Nov. 12-16, 2018, 7 pages.
Mediatek Inc., "Early Transmission in preconfigured UL resources in NB-IoT," 3GPP TSG RAN WG1 Meeting #94bis, R1-1810607, Oct. 8-12, 2018, 6 pages.
Ericsson, "PUR Configuration," 3GPP TSG-RAN WG2 #105, R2-1900736, Feb. 25-Mar. 1, 2019, 12 pages.

* cited by examiner

METHODS FOR ENABLING COMMUNICATION OF ADDITIONAL DATA, RELATED WIRELESS DEVICES AND RADIO NETWORK NODES

The present disclosure pertains to the field of wireless communications. The present disclosure relates to methods for enabling communication of additional data, related wireless devices and radio network nodes.

BACKGROUND

In the 3$^{rd}$ Generation Partnership Project, 3GPP, radio access network techniques are discussed to specify transmissions on pre-allocated uplink resources. For example, pre-allocated uplink resources may be used when a wireless device (e.g. a user equipment, UE) repeatedly performs uplink data transmissions (e.g. recurrent data transmissions of a small size) in a known time interval. In such a situation, the radio network node can configure a repeated pre-allocation of uplink resources. This could be a configuration of a set of future allocations of time and frequency resources, and the configuration of such resources may be signaled from the network node via Radio Resource Control, RRC, signaling. When time for such transmission is reached, the wireless device can transmit data using the pre-allocated resources.

There are situations where the wireless device needs to communicate data in addition to the pre-allocated transmissions. For example, when a wireless device is connected to a cloud server where the wireless device occasionally has a larger amount of data to transmit compared to a general repeated amount of data. This can be referred to a case with a need for additional uplink data. In another example, the network server may occasionally need to transmit status or configuration data to the wireless device. This can be referred to a case with a need for downlink data (e.g. additional downlink data, and/or complementary downlink data). In another example of additional uplink data, a wireless device (e.g. an IoT device, UE) is required to transmit a specific (e.g. temperature) sensor output with a known limited size, and occasionally, the wireless device may need to transmit other sensors output (e.g. pressure, light, accelerometer) and thus, a larger payload than the recurrent one may be needed.

In legacy 3GPP systems, the wireless device may in the case of additional uplink data need to separately perform initial access with several signaling transmissions required to enter RRC connected state and transmit the additional data. This procedure includes performing a contention based random access procedure. Alternatively, for the case of additional downlink data reception from the cloud server, the wireless device would need to be configured with suitable idle mode Discontinuous Reception, DRX, configuration in order to receive a paging. Further, the wireless device would in addition perform the contention based random access, as a response to the paging for the entering into RRC connected state and receiving the downlink data. And only once the wireless device is in RRC connected mode, additional data can be transmitted by the radio network node to the wireless device.

SUMMARY

Accordingly, there is a need for methods for enabling additional communication between a wireless device and a radio network node, which mitigates, alleviates or address the existing shortcomings discussed and provides an improved and more efficient procedure for enabling communication of additional data in connection with a pre-allocated uplink data transmission.

The present disclosure provides a method performed in a wireless device, for enabling communication of additional data in connection with a pre-allocated uplink data transmission. The method comprising communicating between the wireless device and a radio network node, using one or more resources associated with the pre-allocated uplink data transmission, a data indicator indicating that the additional data is to be communicated. The method comprises communicating the additional data, between the wireless device and the radio network node, based on the communicated data indicator.

The present disclosure provides a wireless device which comprises a memory module, a processor module, and a wireless interface. The wireless device is configured to perform any of the methods disclosed herein.

The present disclosure provides a method performed in a radio network node, for supporting communication of additional data in connection with a pre-allocated uplink data transmission, wherein the radio network node is configured to communicate with a wireless device. The method comprises communicating, between the wireless device and the radio network node, using one or more resources associated with the pre-allocated uplink data transmission, a data indicator indicating that the additional data is to be communicated. The method comprises allocating one or more resources for communication of the additional data based on the data indicator. The method comprises communicating between the wireless device and the radio network node, the additional data based on the data indicator and the allocated one or more resources.

The present disclosure provides a radio network node which comprises a memory module, a processor module, and a wireless interface. The radio network node is configured to perform any of the methods disclosed herein.

It is an advantage of the present disclosure that the data indicator allows additional communication between the wireless device and the radio network node to be performed in addition to pre-allocated and/or pre-configured uplink occasions. The present disclosure allows, in one or more embodiments, to reduce at the wireless device a delay for performing the additional communication by avoiding performing channel access procedure. The present disclosure also leads to a reduced power consumption in that a channel access procedure is avoided. The present disclosure also leads to less amount of control signalling in the network, reducing the overall control signalling load in a wireless network.

BRIEF DESCRIPTION OF THE DRAWINGS

The above and other features and advantages of the present disclosure will become readily apparent to those skilled in the art by the following detailed description of exemplary embodiments thereof with reference to the attached drawings, in which.

DETAILED DESCRIPTION

Figure 1A:
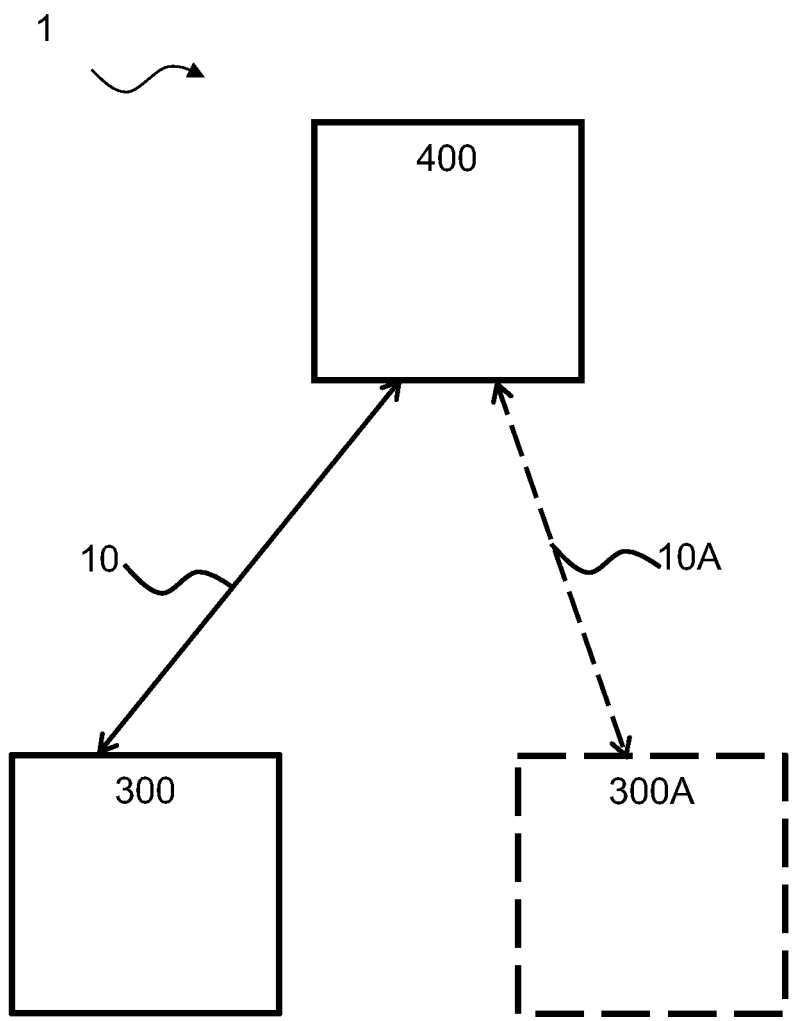
FIG. 1A is a diagram illustrating an exemplary wireless communication system comprising an exemplary radio network node and an exemplary wireless device according to this disclosure.

Various exemplary embodiments and details are described hereinafter, with reference to the figures when relevant. It should be noted that the figures may or may not be drawn to scale and that elements of similar structures or functions are represented by like reference numerals throughout the figures. It should also be noted that the figures are only intended to facilitate the description of the embodiments. They are not intended as an exhaustive description of the invention or as a limitation on the scope of the invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

The figures are schematic and simplified for clarity, and they merely show details which are essential to the understanding of the invention, while other details have been left out. Throughout, the same reference numerals are used for identical or corresponding parts.

FIG. 1A is a diagram illustrating an exemplary wireless communication system 1 comprising an exemplary radio network node 400 and an exemplary wireless device 300 according to this disclosure.

As discussed in detail herein, the present disclosure relates to a wireless communication system 1 comprising a cellular system, e.g. a 3GPP wireless communication system. The wireless communication system 1 comprises a wireless device 300 and/or a radio network node 400.

A radio network node disclosed herein refers to a radio access network node operating in the radio access network, such as a base station, and/or an evolved Node B, eNB, gNB.

The wireless communication system 1 described herein may comprise one or more wireless devices 300, 300A, and/or one or more radio network nodes 400, such as one or more of: a base station, an eNB, a gNB and/or an access point.

A wireless device may refer to as a mobile device and/or a user equipment, UE. Examples of wireless devices comprise a mobile phone device (e.g. a smartphone), a tablet device, and/or an Internet-of-things device.

The wireless device 300, 300A may be configured to communicate with the radio network node 400 via a wireless link (or radio access link) 10, 10A.

The radio network node 400 is configured to control resources (e.g. radio resources) over the wireless link 10. The wireless device 300 may be configured to obtain allocation of one or more resources associated with pre-allocated data transmissions. Resources may comprise one or more pre-configured or pre-allocated uplink, UL, resources (PUR). For example, PUR may comprise a dedicated pre-configured uplink, UL, resource (D-PUR), which is indicative of Physical Uplink Share Channel (PUSCH) resource used by a wireless device. For example, the PUSCH resource associated with D-PUR is time-frequency resource and the D-PUR may be contention-free.

PUR may comprise a Contention-free shared preconfigured UL resource (CFS PUR) which is indicative of an PUSCH resource which may be simultaneously used by more than one wireless device. For example, PUSCH resource associated with CFS PUR is at least time-frequency resource and the CFS PUR is contention-free.

PUR may comprise a Contention-based shared preconfigured UL resource (CBS PUR), which is indicative of an PUSCH resource simultaneously used by more than one wireless device. For example, PUSCH resource associated with CBS PUR is at least time-frequency resource and the CBS PUR is contention-based (alternatively in some embodiments CBS PUR may require contention resolution).

The radio network node 400 is configured to indicate to the wireless device 300 one or more pre-configured or pre-allocated UL resources for transmission of data by e.g. RRC signalling (e.g. UE-specific RRC signalling).

In one or more embodiments, pre-allocate resource and pre-configured resource may be used interchangeably.

In certain implementations the pre-allocation may be preceded by a UE indication transmitted to the network node from the UE indicating the UE's interest in receiving a pre-allocation for uplink transmissions. Such UE indication may include assistance information providing the network node with relevant information about the expected pre-allocation of uplink resources from the UE.

There are situations where the wireless device 300 needs to communicate data in addition to data sent on the pre-allocated resources. For example, when a wireless device 300 is configured to connect to a remote server for transmitting to the remote server a larger amount of data compared to data in the pre-allocated uplink data transmissions. In another example, the wireless device 300 (e.g. an IoT device, UE) may be required to transmit a specific (e.g. temperature) sensor output with a known limited data size, and occasionally, the wireless device 300 may need to transmit other sensors output (e.g. pressure, light, accelerometer) and thus, a larger payload than what fits in the pre-allocated uplink data transmissions may be needed, and hence further uplink resources are required.

The present disclosure proposes to communicate between the wireless device 300 and the radio network node 400 a data indicator indicating that the additional data is to be communicated using one or more resources. This way, the wireless device 300 avoids having to perform additional signalling to communicate the additional data (e.g. initial access with several signaling transmissions required to enter RRC connected state, random access procedure, and/or configuration for idle mode Discontinuous Reception, DRX, configuration in order to receive a paging).

Figure 1B:
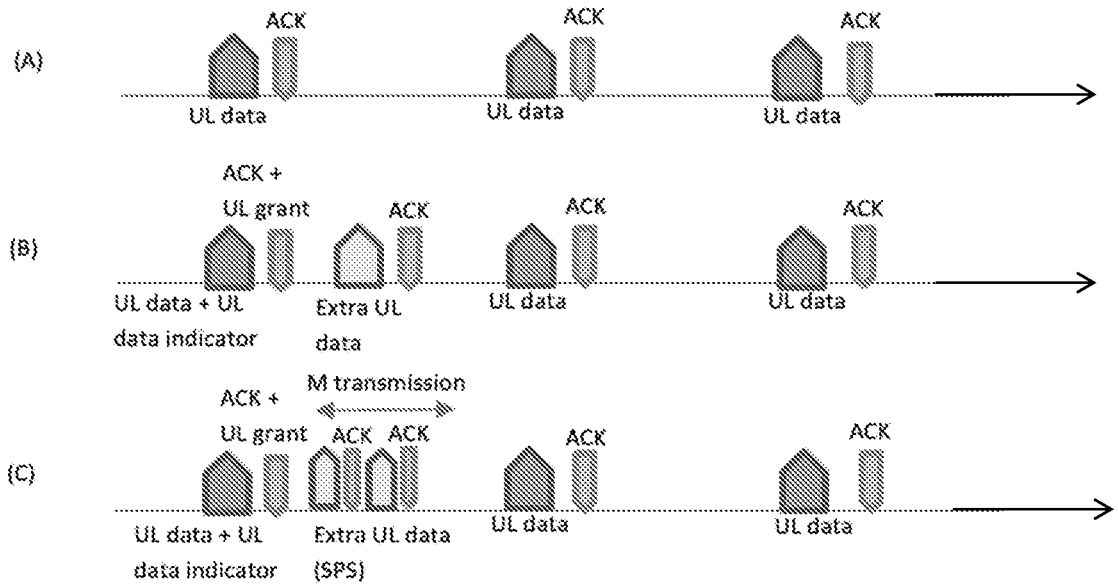
FIGS. 1B-1C-1D are diagrams illustrating an exemplary pre-allocated uplink transmissions between an exemplary radio network node and an exemplary wireless device in example scenarios of embodiments illustrative of a technique according to this disclosure.
Figure 1C:
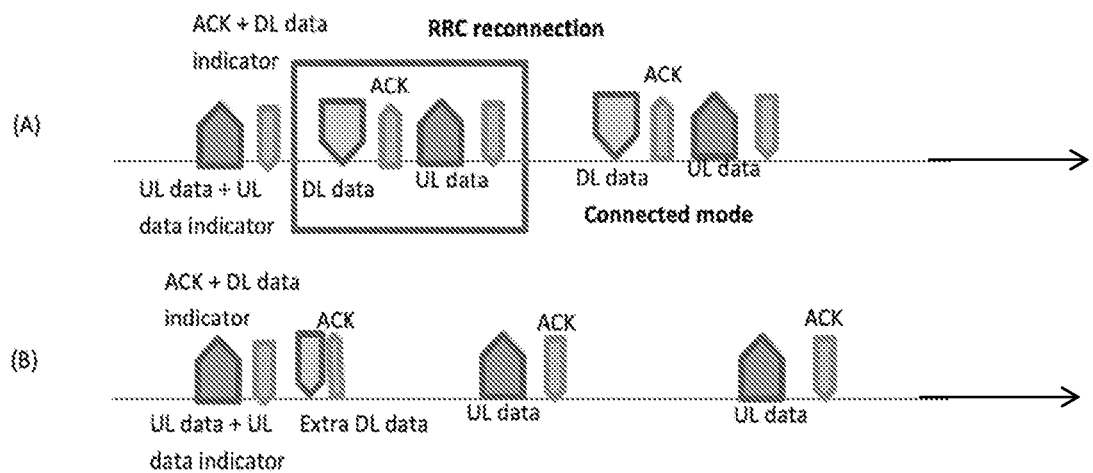
Figure 1D:
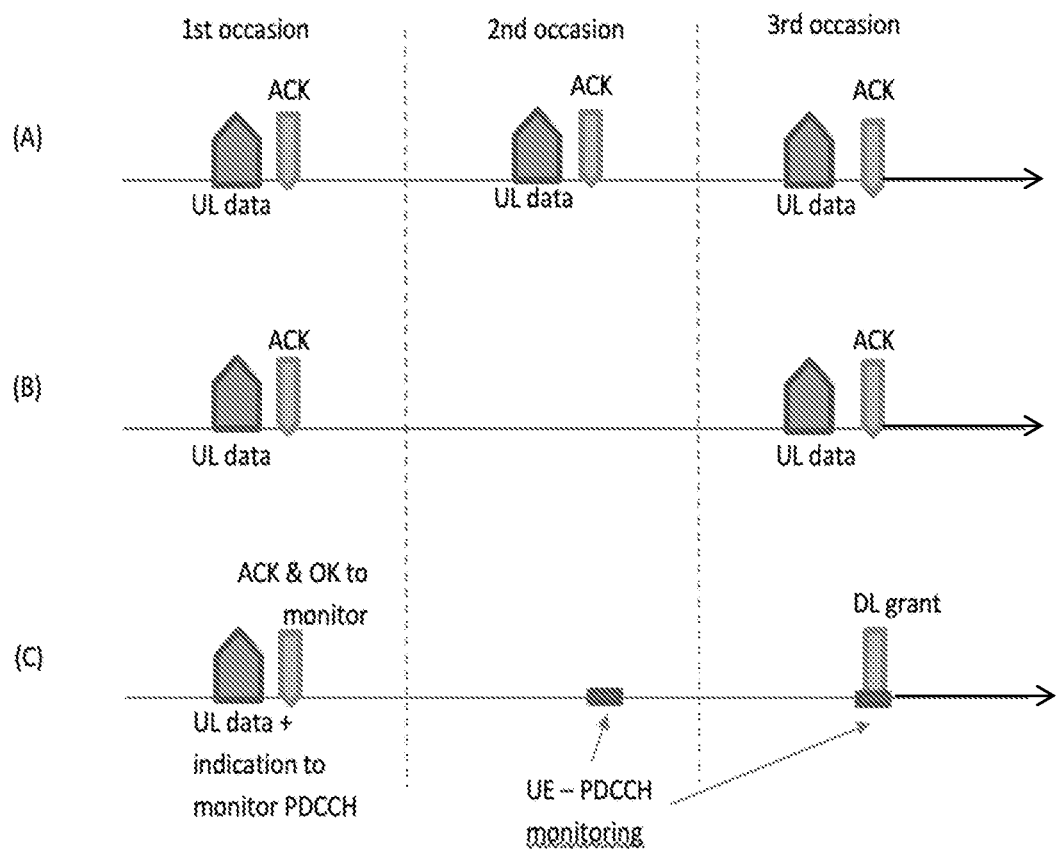

FIGS. 1B-1C-1D are diagrams illustrating example scenarios where the disclosed technique is applied. In FIG. 1B, in example (A), the wireless device is configured to transmit one or more pre-allocated uplink data transmission message(s) indicated by "UL data" and receive one or more respective acknowledgement(s) indicated by "ACK" in the figure. It may be appreciated that FIG. 1B, example (A) shows a first PUR occasion, a second PUR occasion, and a third PUR occasion.

In FIG. 1B, in example (B), a pre-allocated uplink data transmission comprises UL data and an UL data indicator indicating that the wireless device has additional uplink data to transmit to the radio network node. Stated differently, for example, the wireless device indicates to the radio network node in a pre-allocated UL data transmission using a PUR with the UL data indicator indicated by "UL data indicator" that the wireless device requests additional uplink data transmission allocations (e.g. in addition to the existing pre-allocated uplink resource, PUR).

In FIG. 1B, an acknowledgment comprises ACK and an UL grant (shown as "UL grant") indicative of one or more resources for transmission of the additional data (e.g. in response to the UL data indicator). For example, the UL grant may be generated by the radio network node 400 based on the UL data indicator, e.g. in that the UL grant is generated according to a data size indicated in the UL data indicator. For example, the radio network node 400 is configured to respond to the UL data indicator with an UL grant indicating e.g. additional PUR resources corresponding to a data size indicated in the UL data indicator. The network node may respond to the UL data indicator comprising additional PUR resources, semi-persistent scheduling (SPS), or RRC connection setup message.

The wireless device proceeds with the UL transmission of the additional data (shown as "Extra UL data") in message to the radio network node depending on the content of the UL data indicator. The radio network node may be configured to send an acknowledgement of the additional UL data transmission.

In FIG. 1B, in example (C), a pre-allocated uplink data transmission message comprises UL data and a UL data indicator indicating that the wireless device has additional uplink data to transmit to the radio network node.

In FIG. 1B, in example (C), an acknowledgment comprises an UL grant indicative of a semi-persistent scheduling, SPS, indicator (e.g. in response to the UL data indicator). For example, the wireless device proceeds with the UL transmission of the additional data by performing M transmissions according to the SPS to the radio network node. The radio network node may be configured to send corresponding acknowledgements of the additional UL data transmission according to SPS as illustrated.

In FIG. 1C, in example (A), the wireless device is configured to transmit one or more pre-allocated uplink data transmission message and receive one or more respective acknowledgement(s) according to PUR occasions: e.g. a first PUR occasion, a second PUR occasion, and a third PUR occasion.

In FIG. 1C, in example (A), the acknowledgement comprises a DL data indicator indicating that the radio network node has downlink data to transmit to the wireless device. The DL data indicator is indicative of a radio resource control, RRC, connection setup request. For example, by transmitting the DL data indicator, the radio network node requests the wireless device to proceed with RRC connection setup and transmits the DL data indicator, in an acknowledgment, wherein the DL data indicator is an indicator to trigger RRC connection request. The wireless device may then proceed to perform the RRC connection as shown in example (A) of FIG. 1C. The radio network node is configured to transmit the DL data in a following message to the wireless device in RRC connected mode. The wireless device may be configured to acknowledge the DL data message by transmitting an acknowledgment to the radio network node.

In FIG. 1C, example (B), the acknowledgement comprises a DL data indicator indicative of one or more resources for reception of the additional data. The wireless device is then ready for the additional data transmission in message shown as "extra DL data" from the radio network node which is then acknowledged by the wireless device.

In FIG. 1D, example (A) shows a first PUR occasion, a second PUR occasion and a third PUR occasion.

In FIG. 1D, example (B), the wireless device is configured to transmit a pre-allocated uplink data transmission message and receive an acknowledgement in the first and third PUR occasions. The wireless device does not utilize a second PUR occasion for transmitting UL data, and a third PUR occasion for transmitting UL data in this example.

In FIG. 1D, example (C), the pre-allocated uplink data transmission message comprises a UL data indicator indicating that the wireless device intends to monitor PDCCH and optionally UL data. For example, the wireless device indicates with the UL data indicator that the wireless device intends to start monitoring PDCCH (because for example the wireless device expects to receive DL data e.g. from a network server).

For example, the wireless device can indicate in the PUR data transmission, that the wireless device expects an additional downlink response and thus, the wireless device intends to monitor the downlink control channel (e.g. PDCCH) even if the wireless device may not use the second and third PUR occasions for uplink transmissions. For example, when the wireless device does not transmit UL data in the second and third PUR occasions. In one or more embodiments, the wireless device is configured to monitor PDCCH even when no uplink transmission has been performed. For example, the PDCCH monitoring may take place in the same cycle or occasion as second and third PUR occasion or in another occasion. In one or more example methods, the DL data indicator comprises an approval indicator to confirm to the wireless device the monitoring of PDCCH. For example, the approval indicator may indicate to the wireless device an acceptance by the radio network node of the UL data indicator comprising indicator that the wireless device intends to monitor PDCCH. In FIG. 7C, the wireless device 300 does not transmit UL data in the second PUR occasion, there is no need for the wireless device to monitor ACK/NACK, however the wireless device monitors PDCCH even when no uplink transmission has been performed because the wireless device has transmitted an UL data indicator indicating monitoring of PDCCH by the wireless device and/or because the wireless device has received the DL data indicator comprising an approval indicator to confirm to the wireless device the monitoring of PDCCH. For example, the PDCCH monitoring may take place in the same cycle or occasion as PUR or in another occasion where the radio network node transmits a DL grant.

Figure 2:
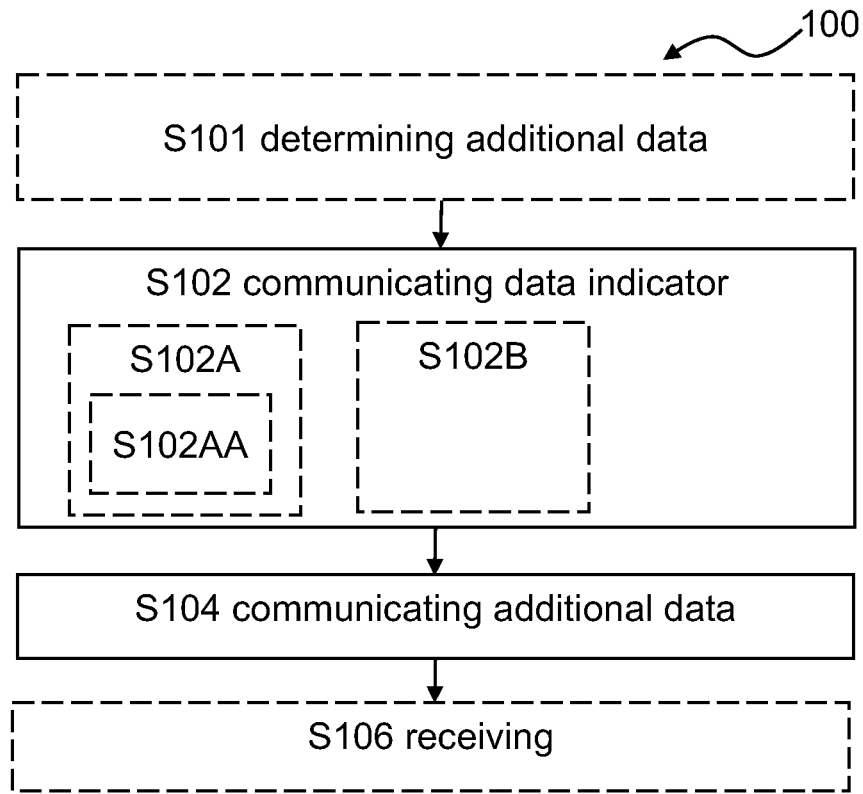
FIG. 2 is a flow-chart illustrating an exemplary method, performed in a wireless device, for enabling communication of additional data in connection with a pre-allocated uplink data transmission according to this disclosure.

FIG. 2 shows a flow diagram of an exemplary method 100 performed in a wireless device according to the disclosure. The method 100 is performed in a wireless device (e.g. a wireless device disclosed herein, e.g. wireless device 300 of FIGS. 1 and 4), for enabling communication of additional data in connection with a pre-allocated uplink data transmission. The additional data may refer to data communicated in addition to data transmitted in the pre-allocated uplink data transmission. In other words, the additional data is an addition to the pre-allocated uplink data.

The method 100 comprises communicating S102, between the wireless device and a radio network node, using one or more resources associated with the pre-allocated uplink data transmission, a data indicator indicating that the additional data is to be communicated. The data indicator may refer to an indicator of additional data to be communicated between the wireless device and the radio network node. For example, the data indicator may be indicative of a size or amount of additional data to be communicated (e.g. a size range). For example, the data indicator may be part of PUSCH message as a message field. For example, the data indicator may be based on or included as a buffer status report, BSR.

The one or more resources associated with the pre-allocated uplink data transmission may comprise one or more pre-allocated uplink resources and/or pre-configured uplink resources. The one or more resources with the pre-allocated uplink data transmission may comprise one or more downlink, DL, resources associated with the pre-allocated uplink data transmission, such as DL resources for receiving an acknowledgment of the pre-allocated uplink data transmission from the radio network node.

The method 100 comprises communicating S104 the additional data, between the wireless device and the radio network node, based on the communicated data indicator. The additional data may refer to data communicated in addition to data transmitted in the pre-allocated uplink data transmission.

The data indicator advantageously permits to signal for additional communication between the wireless device and the radio network node to be enabled in addition to pre-allocated and/or pre-configured uplink occasions In one or more example methods, the data indicator is included in a pre-allocated data transmission. For example, the data indicator is included in the data transmission using the pre-allocated resources (e.g. pre-allocated PUSCH resources). The pre-allocated data transmission may refer to a data transmission performed on a pre-allocated uplink resource by the wireless device.

In one or more example methods, the data indicator is included in an acknowledgement of a pre-allocated data transmission. For example, the data indicator is included in the acknowledgement of the data transmission performed using the pre-allocated resources. An acknowledgment may comprise an acknowledgment (ACK) signal or a non-acknowledgement (NACK) signal.

In one or more example methods, communicating S102 the data indicator comprises sending S102A to the radio network node an uplink, UL, data indicator indicating that the wireless device has additional uplink data to transmit. In other words, for example, the wireless device indicates in a pre-allocated UL data transmission using a PUR with the UL data indicator that the wireless device expects additional uplink data transmission allocations (e.g. in addition to the existing pre-allocated uplink resource, PUR).

In one or more example methods, the data indicator comprises a DL data indicator indicative of one or more resources for transmission of the additional data, and/or a semi-persistent scheduling, SPS, indicator. The DL data indicator may comprise an UL grant indicative of one or more resources for transmission of the additional data, and/or a semi-persistent scheduling, SPS, indicator.

In one or more example methods, the method 100 comprises receiving S106 an UL grant indicative of one or more resources for transmission of the additional data, and/or a semi-persistent scheduling, SPS, indicator (e.g. in response to the UL data indicator). For example, the UL grant may be generated by the radio network node based on the UL data indicator, e.g. in that the UL grant is generated according to a data size indicated in the UL data indicator. For example, the radio network node is configured to respond to the UL data indicator with an UL grant indicating e.g. additional PUR resources, and/or semi persistent scheduling (SPS). The UL grant may be received by the wireless device together with an acknowledgement of the pre-allocated UL data transmission. The wireless device may be configured to continue with a corresponding procedure, depending on the indication in the UL grant.

In one or more example methods, the one or more resources associated with the pre-allocated uplink data transmission comprise one or more pre-allocated uplink resources, PUR. For example, the pre-allocated uplink resources may comprise preconfigured UL resources. For example, the one or more resources associated with data transmission performed using the pre-allocated uplink comprise one or more pre-allocated uplink resources.

In one or more example methods, sending S102A to the radio network node an uplink data indicator indicating that the wireless device has additional uplink data to transmit comprises transmitting S102AA the UL data indicator to the radio network node using at least one of the pre-allocated uplink resources. For example, the UL data indicator may comprise a message field with a flag in a PUSCH message, e.g. as part of BSR. In one or more exemplary methods, transmitting the UL data indicator to the radio network node using at least one of the pre-allocated uplink resources comprises transmitting a buffer status report, BSR, on at least one of the pre-allocated uplink resources.

In one or more example methods, the method 100 comprises determining S101 that additional data is to be communicated to the radio network node in addition to data allocated to the pre-allocated uplink resources.

In one or more example methods, communicating S102 the data indicator comprises receiving S102B from the radio network node a downlink, DL, data indicator indicating that the radio network node has downlink data to transmit to the wireless device. For example, the radio network node indicates by transmitting the DL data indicator (e.g. in the ACK message responding to the uplink PUR transmission from the wireless device), that the network has additional DL data for the wireless device.

In one or more example methods, the data indicator comprises a DL data indicator indicative of one or more resources for reception of the additional data and/or a radio resource control, RRC, connection setup request. For example, by transmitting 5202B the DL data indicator, the radio network node requests the wireless device to proceed with RRC connection setup and transmits the DL data indicator, in an acknowledgment, wherein the DL data indicator is an indicator to trigger RRC connection request. The wireless device may then proceed to RRC connected mode.

In one or more examples, the radio network node may transmit the DL data indicator to request the wireless device to be ready for additional DL data transmission when the DL data indicator indicates one or more resources for reception of the additional data.

In one or more example methods, the DL data indicator is configured to request the wireless device to monitor a Physical Downlink Control Channel, PDCCH. For example, the radio network node may be configured to indicate with DL data indicator in an acknowledgment responding to the Uplink PUR transmission that the radio network node is expecting to schedule data to the wireless device at a later stage, asking the wireless device to either remain awake, monitor e.g. some wake-up signal, or at next PUR occasion. In other words, the DL data indicator may be used to indicate to the wireless device to keep PDCCH monitoring. This may lead to a reduced delay since the wireless device skips the costly channel access procedure. For example, the wireless device receives the DL data indicator requesting the wireless device to monitor PDCCH and the wireless device monitors PDCCH, e.g. even when the wireless device does not utilize the PUR occasions to transmit UL data. For example, the wireless device can indicate in the PUR data transmission, that the wireless device expects an additional downlink response and thus, the wireless device intends to monitor the downlink control channel (e.g. PDCCH) even if the wireless device may not use one or more future PUR allocations. This is illustrated FIGS. 1D and 7C. For example, when the wireless device does not transmit UL data in the PUR occasions, there is no need for the wireless device to monitor ACK/NACK. In one or more embodiments, the wireless device is configured to monitor PDCCH even when no uplink transmission has been performed. For example, the PDCCH monitoring may take place in the same cycle or occasion as PUR or in another occasion.

Figure 3:
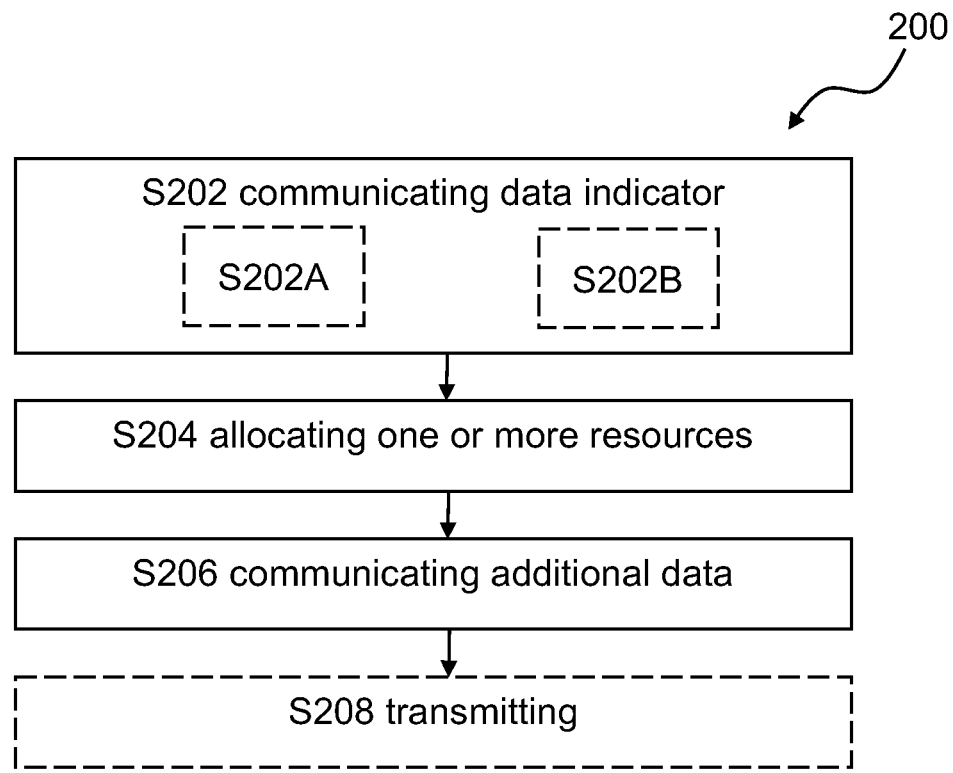
FIG. 3 is a flow-chart illustrating an exemplary method, performed in a radio network node of a wireless communication system, for supporting communication of additional data in connection with a pre-allocated uplink data transmission according to this disclosure.

FIG. 3 shows a flow diagram of an exemplary method 200 performed in a radio network node according to the disclosure.

Figure 5:
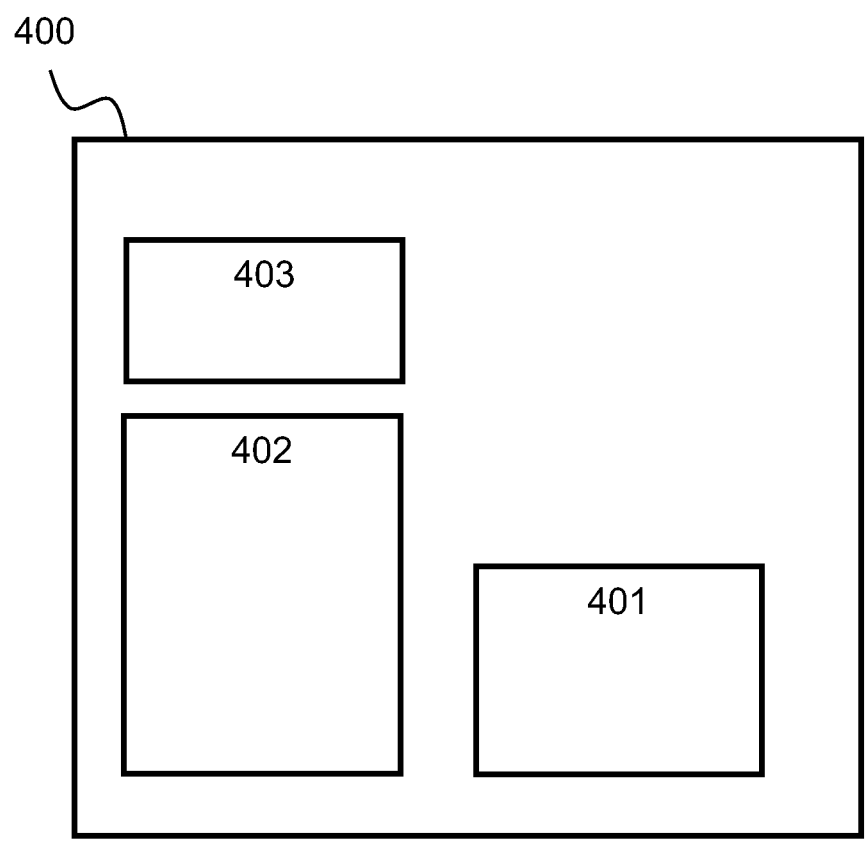
FIG. 5 is a block diagram illustrating an exemplary radio network node according to this disclosure.

The method 200 is performed in a radio network node (e.g. a radio network node disclosed herein, e.g. radio network node 400 of FIGS. 1A and 5), for supporting communication of additional data in connection with a pre-allocated uplink data transmission. The additional data may refer to data communicated in addition to data transmitted in the pre-allocated uplink data transmission. In other words, the additional data is an addition to the pre-allocated uplink data.

In one or more example methods, the radio network node is configured to communicate with a wireless device.

In one or more example methods, the method 200 comprises communicating S202, between the wireless device and the radio network node, using one or more resources associated with the pre-allocated uplink data transmission, a data indicator indicating that the additional data is to be communicated. The data indicator may refer to an indicator of additional data to be communicated between the wireless device and the radio network node. For example, the data indicator may be indicative of a size or amount of additional data to be communicated (e.g. a size range). For example, the data indicator may be part of PUSCH message as a message field. For example, the data indicator may be based on or included as a buffer status report, BSR. Resources associated with the pre-allocated uplink data transmission may comprise pre-allocated uplink resources and/or pre-configured uplink resources. Resources associated with the pre-allocated uplink data transmission may comprise downlink, DL, resources associated with the pre-allocated uplink data transmission, such as DL resources for transmitting an acknowledgment of the pre-allocated uplink data transmission to the wireless device.

In one or more example methods, the method 200 comprises allocating S204 one or more resources for communication of the additional data based on the data indicator. For example, the radio network node is configured to allocate, based on the data indicator (e.g. based on a data size indicated by the data indicator) one or more resources for communicating the additional data between the wireless device and the radio network node.

In one or more example methods, the method 200 comprises communicating S206, between the wireless device and the radio network node, the additional data based on the data indicator and the allocated one or more resources.

In one or more example methods, the data indicator is included in a pre-allocated data transmission from the wireless device or in an acknowledgement of a pre-allocated data transmission to the wireless device. The pre-allocated data transmission may refer to a data transmission performed by the wireless device to the radio network node on a pre-allocated uplink resource. An acknowledgment may comprise an acknowledgment (ACK) signal or a non-acknowledgement (NACK) signal.

In one or more example methods, communicating S202 the data indicator comprises receiving S202A from the wireless device an uplink, UL, data indicator indicating that the wireless device has additional uplink data to transmit. Stated differently, for example, the radio network node receives from the wireless device the UL data indicator (e.g. in a pre-allocated UL data transmission using a PUR), which indicates to the radio network node that the wireless device expects or plans for additional uplink data transmission allocations (e.g. in addition to the existing pre-allocated uplink resource, PUR). For example, the UL data indicator may be part of a message field with a flag in a PUSCH message, e.g. as part of BSR. In one or more exemplary methods, receiving the UL data indicator from the wireless device using at least one of the pre-allocated uplink resources comprises receiving a buffer status report, BSR, on at least one of the pre-allocated uplink resources.

In one or more example methods, the method 200 comprising transmitting S208 an UL grant indicative of one or more resources for transmission of the additional data, and/or a semi-persistent scheduling, SPS, indicator. For example, in response to the UL data indicator, the radio network node responds with an UL grant indicating e.g. additional PUR resources, and/or semi persistent scheduling (SPS). For example, the radio network node transmits to the wireless device the UL grant together with an acknowledgement of the pre-allocated UL data transmission (including the UL data indicator). The UL grant may be comprised in a DL data indicator.

In one or more example methods, communicating S202 the data indicator comprises transmitting S202B to the wireless device a downlink, DL, data indicator indicating that the radio network node has downlink data to transmit to the wireless device. For example, the radio network node indicates by transmitting the DL data indicator (e.g. in the ACK message responding to the uplink PUR transmission from the wireless device), that the network has additional DL data for the wireless device.

In one or more exemplary methods, the data indicator comprises a DL data indicator indicative of one or more resources for reception of the additional data and/or a radio resource control, RRC, connection setup request. Stated differently, for example, by transmitting S202B the DL data indicator, the radio network node requests the wireless device to proceed with RRC connection setup and transmits the DL data indicator, in an acknowledgment, wherein the DL data indicator is an indicator to trigger RRC connection request. The wireless device may then proceed to RRC connected mode. In one or more examples, the radio network node may transmit transmitting S202B the DL data indicator to request the wireless device to monitor PDDCH so as to be ready for additional DL data transmission.

In one or more example methods, the uplink, UL, data indicator comprises an indicator that the wireless device intends to monitor PDCCH. For example, the wireless device indicates with the UL data indicator that the wireless device intends to start monitoring PDCCH (because for example the wireless device expects to receive DL data e.g. from a network server). For example, the wireless device can indicate in the PUR data transmission, that the wireless device expects an additional downlink response and thus, the wireless device intends to monitor the downlink control channel (e.g. PDCCH) even if the wireless device may not use one or more future PUR allocations. This is illustrated FIG. 7C. For example, when the wireless device does not transmit UL data in the PUR occasions, there is no need for the wireless device to monitor ACK/NACK. In one or more embodiments, the wireless device is configured to monitor PDCCH even when no uplink transmission has been performed. For example, the PDCCH monitoring may take place in the same cycle or occasion as PUR or in another occasion. In one or more example methods, the DL data indicator comprises an approval indicator to confirm to the wireless device the monitoring of PDCCH. For example, the approval indicator may indicate to the wireless device an acceptance by the radio network node of the UL data indicator comprising indicator that the wireless device intends to monitor PDCCH.

An exemplary scenario where the radio network node receives UL, data indicator indicating that the wireless device intends to monitor PDCCH may be illustrated by a situation where the wireless device has transmitted an alarm message and waits for a response from e.g. a cloud server. The response from the cloud server may be delivered to the radio network node and then to the wireless device after the available slot for ACK/NACK.

For example, the radio network node may be configured to indicate with DL data indicator in an acknowledgment responding to the Uplink PUR transmission that the radio network node is expecting to schedule data to the wireless device at a later stage, asking the wireless device to either remain awake, monitor e.g. some wake-up signal, or at next PUR occasion. In other words, the DL data indicator indicated to the wireless device to keep PDCCH monitoring. This may lead to a reduced delay since the wireless device skips the costly channel access procedure.

The present disclosure allows in one or more embodiments the radio network node to have an additional possibility to communicate with the wireless device. This enables reducing a delay before the radio network node can access the wireless device via paging or a random access procedure, when a response is expected from the radio network node relaying the response from e.g. the cloud server.

Figure 4:
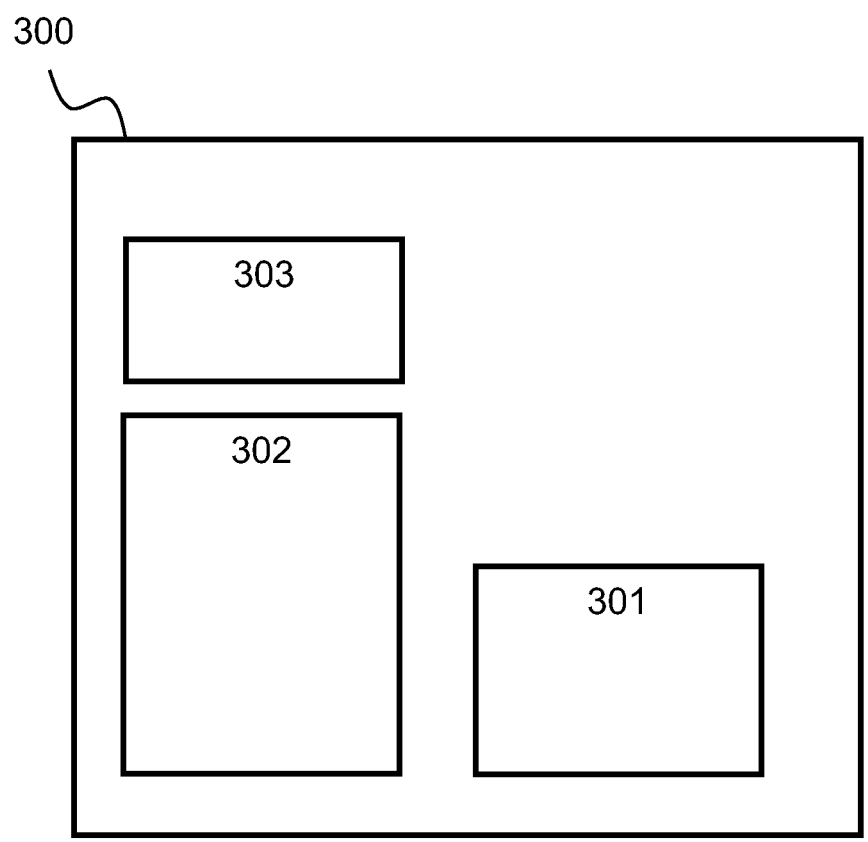
FIG. 4 is a block diagram illustrating an exemplary wireless device according to this disclosure.

FIG. 4 shows a block diagram of an exemplary wireless device 300 according to the disclosure. The wireless device 300 comprises a memory module 301, a processor module 302, and a wireless interface 303. The wireless device 300 may be configured to perform any of the methods disclosed in FIG. 2.

The wireless device 300 is configured to communicate with a radio network node, such as the radio network node disclosed herein, using a wireless communication system. The wireless interface 303 is configured for wireless communications via a wireless communication system, such as a 3GPP system, such as a 3GPP system supporting PUR.

The wireless device 300 is configured to communicate, e.g. via the wireless interface 403, between the wireless device 300 and a radio network node, using one or more resources associated with the pre-allocated uplink data transmission, a data indicator indicating that the additional data is to be communicated.

The wireless device 300 is configured to communicate the additional data, between the wireless device 300 and the radio network node, based on the communicated data indicator. The additional data may refer to data communicated in addition to data transmitted in the pre-allocated uplink data transmission.

In one or more example wireless devices, the data indicator is included in a pre-allocated data transmission. The pre-allocated data transmission may refer to a data transmission performed on a pre-allocated uplink resource by the wireless device.

In one or more example wireless devices, the data indicator is included in an acknowledgement of a pre-allocated data transmission. An acknowledgment may comprise an acknowledgment (ACK) signal or a non-acknowledgement (NACK) signal.

The processor module 302 is optionally configured to perform any of the operations disclosed in FIG. 2 (e.g. S102A, S102B, S102AA, S106). The operations of the wireless device 300 may be embodied in the form of executable logic routines (e.g., lines of code, software programs, etc.) that are stored on a non-transitory computer readable medium (e.g., the memory module 301) and are executed by the processor module 302).

Furthermore, the operations of the wireless device 300 may be considered a method that the wireless module is configured to carry out. Also, while the described functions and operations may be implemented in software, such functionality may as well be carried out via dedicated hardware or firmware, or some combination of hardware, firmware and/or software.

The memory module 301 may be one or more of a buffer, a flash memory, a hard drive, a removable media, a volatile memory, a non-volatile memory, a random access memory (RAM), or other suitable device. In a typical arrangement, the memory module 301 may include a non-volatile memory for long term data storage and a volatile memory that functions as system memory for the processor module 302. The memory module 301 may exchange data with the processor module 302 over a data bus. Control lines and an address bus between the memory module 301 and the processor module 304 also may be present (not shown in FIG. 4). The memory module 301 is considered a non-transitory computer readable medium.

FIG. 5 shows a block diagram of an exemplary radio network node 400 according to the disclosure. The radio network node 400 comprises a memory module 401, a processor module 402, and a wireless interface 403. The radio network node 400 may be configured to perform any of the methods disclosed in FIG. 3.

The radio network node 400 is configured to communicate with a wireless device, such as wireless device 300 disclosed herein, using a wireless communication system (as illustrated in FIG. 1A). The wireless interface 403 is configured to communicate with the wireless device via a wireless communication system, such as a 3GPP system.

The radio network node 400 is configured to, via the wireless interface 403, communicate, between the wireless device and the radio network node, using one or more resources associated with the pre-allocated uplink data transmission, a data indicator indicating that the additional data is to be communicated.

The radio network node 400 is configured to, via the processor module 403 403, allocate one or more resources for communication of the additional data based on the data indicator; and The radio network node 400 is configured to, via the wireless interface 403, communicate, between the wireless device and the radio network node, the additional data based on the data indicator and the allocated one or more resources.

The processor module 402 is optionally configured to perform any of the operations disclosed in FIG. 3, e.g. S202A, S202B, S208. The operations of the radio network node 400 may be embodied in the form of executable logic routines (e.g., lines of code, software programs, etc.) that are stored on a non-transitory computer readable medium (e.g., the memory module 401) and are executed by the processor module 402).

Furthermore, the operations of the radio network node 400 may be considered a method that the wireless device is configured to carry out. Also, while the described functions and operations may be implemented in software, such functionality may as well be carried out via dedicated hardware or firmware, or some combination of hardware, firmware and/or software.

The memory module 401 may be one or more of a buffer, a flash memory, a hard drive, a removable media, a volatile memory, a non-volatile memory, a random access memory (RAM), or other suitable device. In a typical arrangement, the memory module 401 may include a non-volatile memory for long term data storage and a volatile memory that functions as system memory for the processor module 402. The memory module 401 may exchange data with the processor module 402 over a data bus. Control lines and an address bus between the memory module 401 and the processor module 402 also may be present (not shown in FIG. 5). The memory module 401 is considered a non-transitory computer readable medium.

Figure 6A:
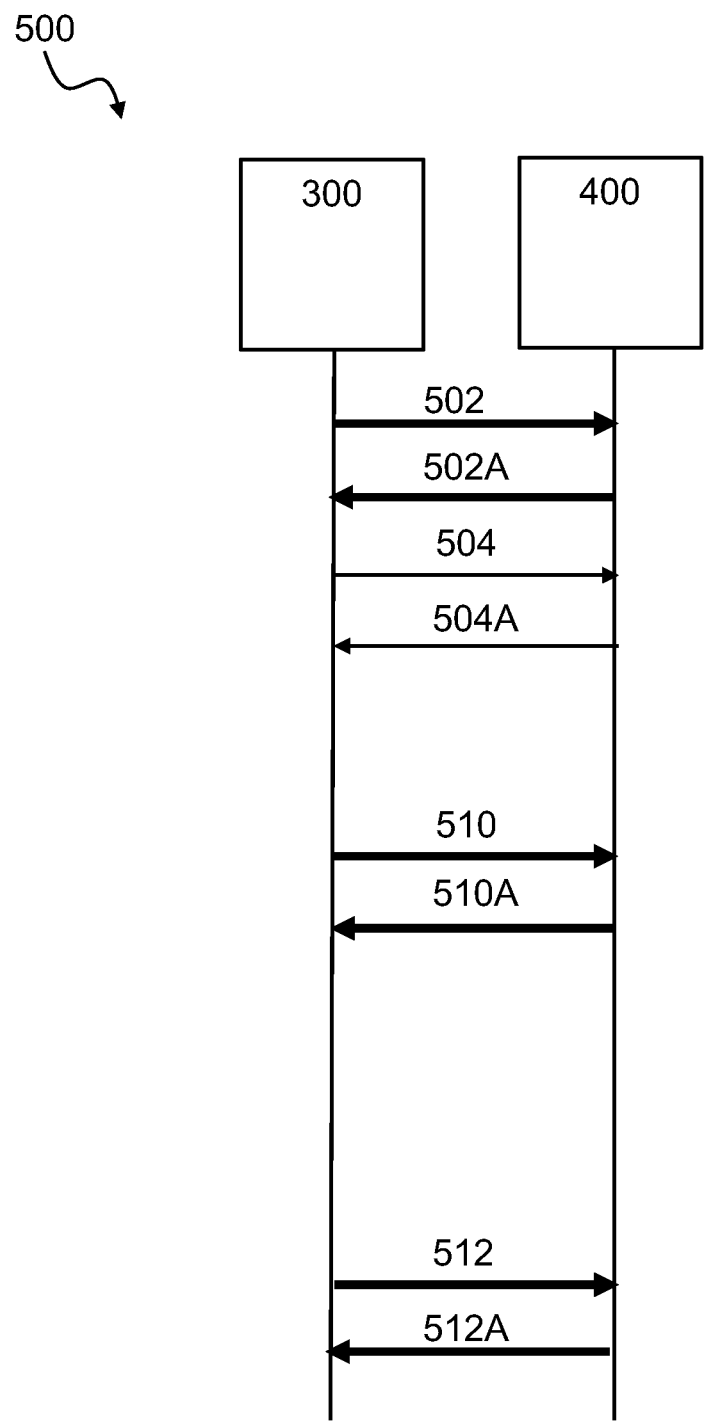
FIGS. 6A-6B are signalling diagrams between an exemplary wireless device and an exemplary radio network node according to this disclosure.
Figure 6B:
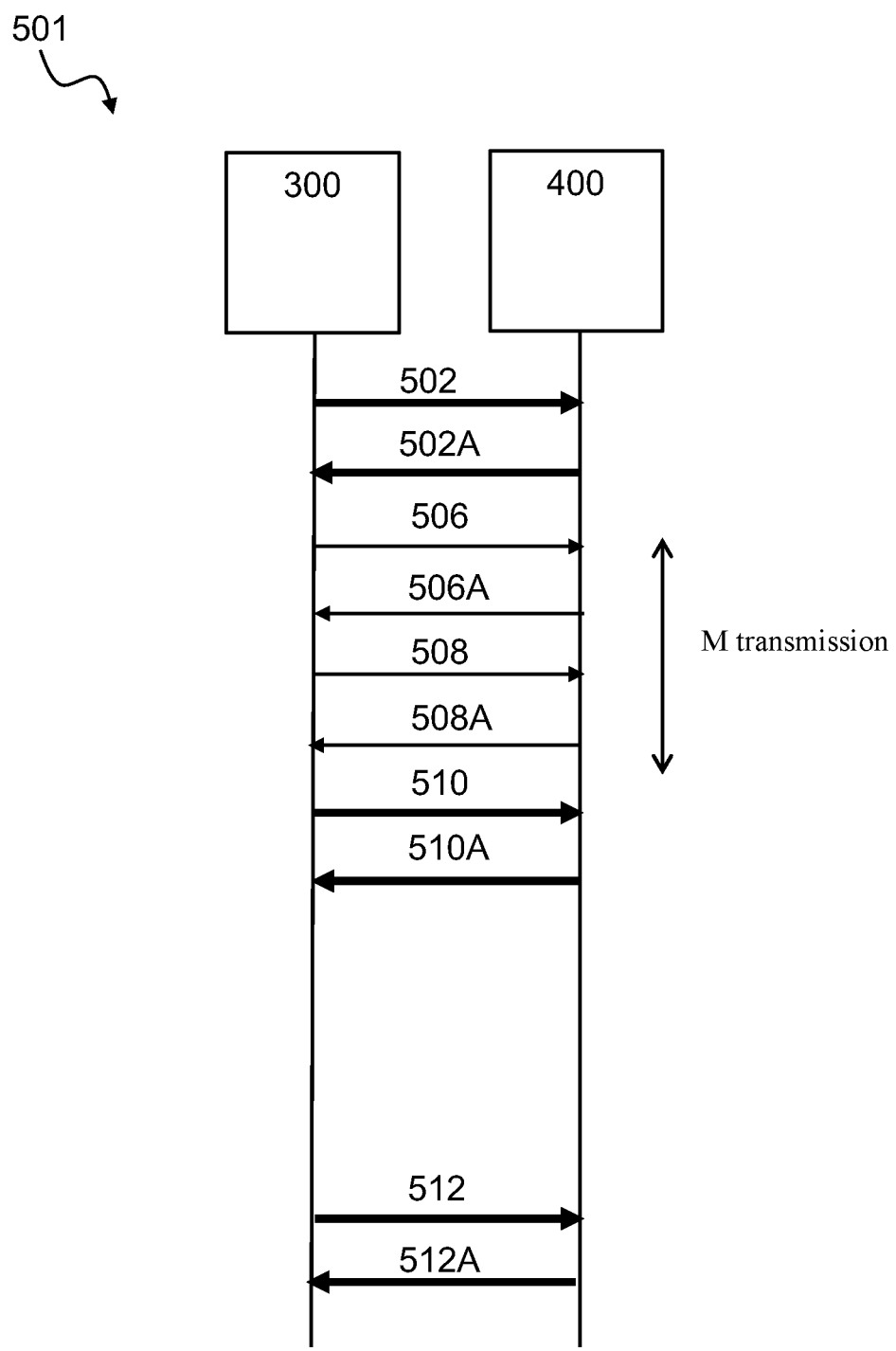

FIGS. 6A-6B show exemplary signaling diagrams 500, 501 between an exemplary wireless device 300 and an exemplary radio network node 400.

In FIGS. 6A-6B, the wireless device 300 may be configured to transmit one or more pre-allocated uplink data transmission message(s) 502, 510, 512 and receive one or more respective acknowledgement(s) 502A, 510A, 512A. These may be referred to as a first PUR occasion for 502, a second PUR occasion for 510, and a third PUR occasion for 512.

In FIG. 6A, the pre-allocated uplink data transmission message 502 comprises a UL data indicator indicating that the wireless device 300 has additional uplink data to transmit to the radio network node 400. Stated differently, for example, the wireless device 300 indicates to the radio network node 400 in a pre-allocated UL data transmission using a PUR with the UL data indicator that the wireless device 300 requests additional uplink data transmission allocations (e.g. in addition to the existing pre-allocated uplink resource, PUR).

In FIG. 6A, the acknowledgment 502A comprises an UL grant indicative of one or more resources for transmission of the additional data (e.g. in response to the UL data indicator). For example, the UL grant may be generated by the radio network node 400 based on the UL data indicator, e.g. in that the UL grant is generated according to a data size indicated in the UL data indicator. For example, the radio network node 400 is configured to respond to the UL data indicator with an UL grant indicating e.g. additional PUR resources corresponding to a data size indicated in the UL data indicator.

The wireless device 300 proceeds with the UL transmission of the additional data in message 504 to the radio network node 400. The radio network node 400 may be configured to send an acknowledgement 504A of the additional UL data transmission.

In FIG. 6B, the pre-allocated uplink data transmission message 502 comprises a UL data indicator indicating that the wireless device 300 has additional uplink data to transmit to the radio network node 400.

In FIG. 6B, the acknowledgment 502A comprises an UL grant indicative of a semi-persistent scheduling, SPS, indicator (e.g. in response to the UL data indicator). For example, the wireless device 300 proceeds with the UL transmission of the additional data by performing M transmissions according to the SPS in messages 506, 508 to the radio network node 400. The radio network node 400 may be configured to send corresponding acknowledgements 506A, 508A of the additional UL data transmission according to SPS.

Figure 7A:
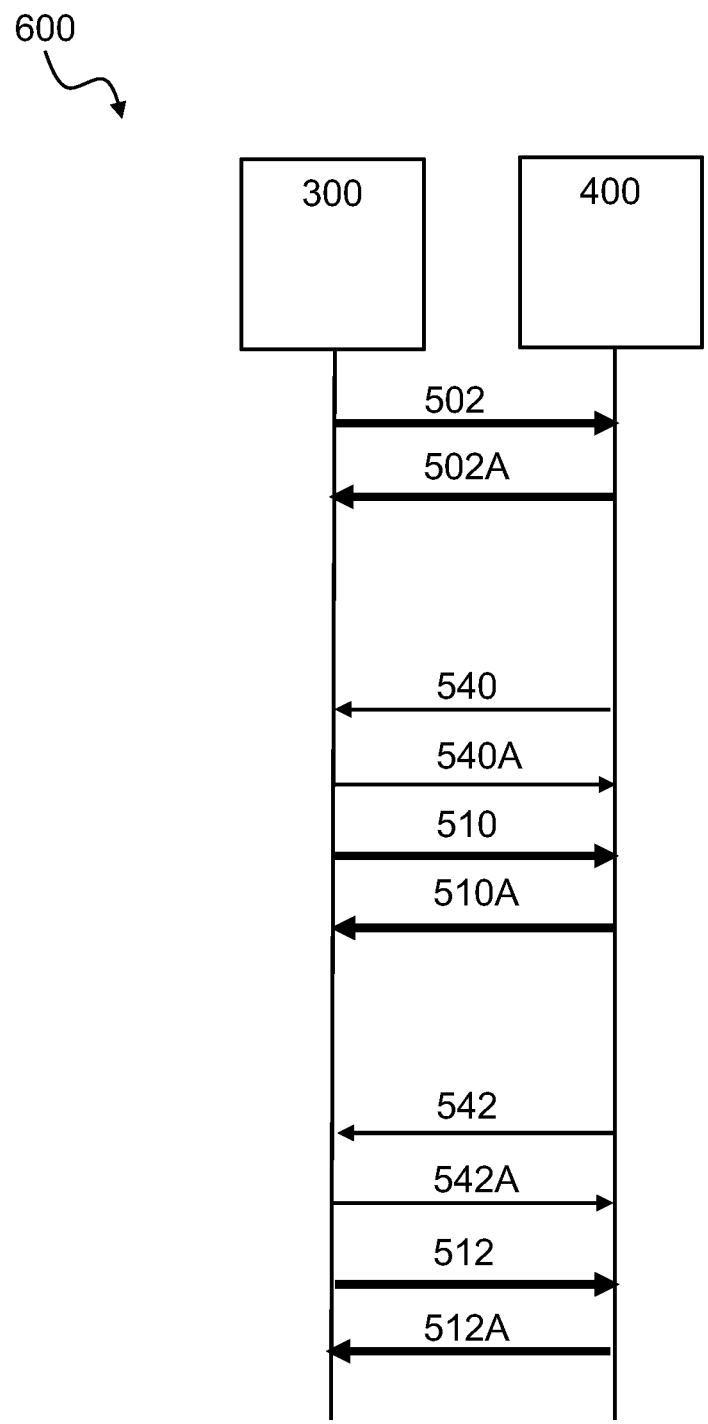
FIGS. 7A-7B-7C are signalling diagrams between an exemplary wireless device and an exemplary radio network node according to this disclosure.
Figure 7B:
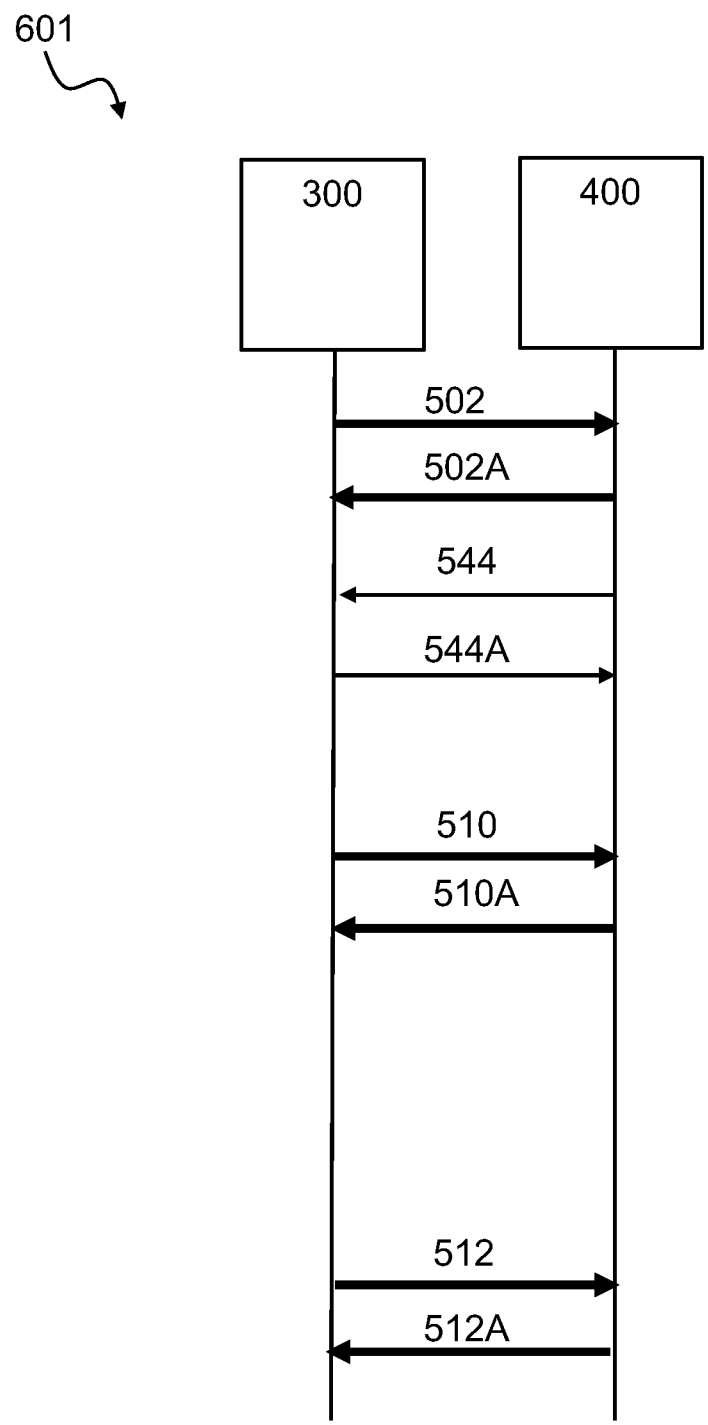
Figure 7C:
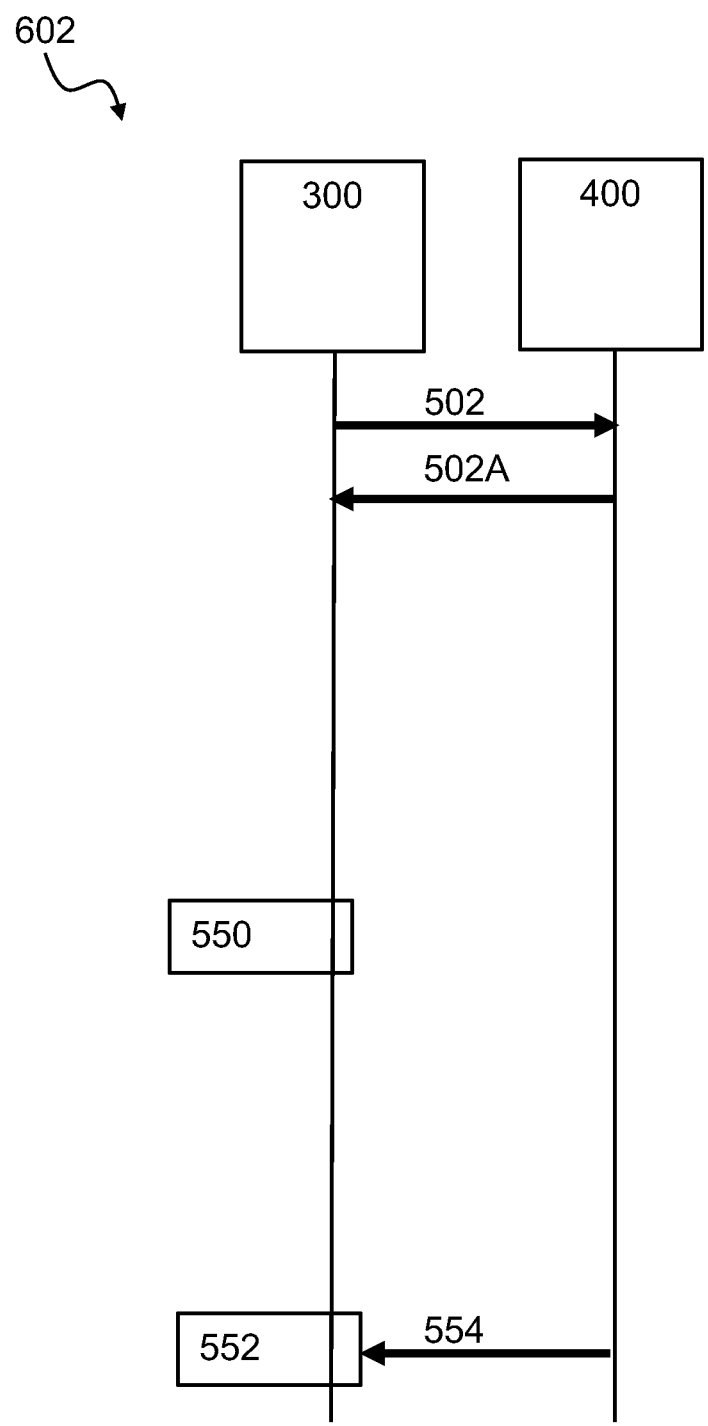

FIGS. 7A-7B-7C show exemplary signaling diagrams 600, 601, 602 between an exemplary wireless device 300 and an exemplary radio network node 400.

In FIGS. 7A-7B, the wireless device 300 may be configured to transmit one or more pre-allocated uplink data transmission message(s) 502, 510, 512 and receive one or more respective acknowledgement(s) 502A, 510A, 512A. These may be referred to as a first PUR occasion for 502, a second PUR occasion for 510, and a third PUR occasion for 512.

In FIG. 7A, the acknowledgement 502A comprises a DL data indicator indicating that the radio network node 400 has downlink data to transmit to the wireless device 300. The DL data indicator is indicative of a radio resource control, RRC, connection setup request. For example, by transmitting the DL data indicator in 502A, the radio network node 400 requests the wireless device 300 to proceed with RRC connection setup and transmits the DL data indicator, in an acknowledgment 502, wherein the DL data indicator is an indicator to trigger RRC connection request. The wireless device 300 may then proceed to perform the RRC connection via messages 540, 540A. The radio network node 400 is configured to transmit the DL data in message 542 to the wireless device 300 in RRC connected mode. The wireless device 300 may be configured to acknowledge the DL data message 542 by transmitting an acknowledgment 542A to the radio network node 400.

In FIG. 7B, the acknowledgement 502A comprises a DL data indicator indicative of one or more resources for reception of the additional data. The wireless device 300 is then ready for the additional data transmission in message 544 from the radio network node 400.

In FIG. 7C, the wireless device 300 may be configured to transmit a pre-allocated uplink data transmission message 502 and receive an acknowledgement 502A, 510A, 512A. The wireless device 300 does not utilize a second PUR occasion for transmitting UL data, and a third PUR occasion for transmitting UL data in this example.

In FIG. 7C, the pre-allocated uplink data transmission message 502 comprises a UL data indicator indicating that the wireless device 300 intends to monitor PDCCH. For example, the wireless device 300 indicates with the UL data indicator that the wireless device 300 intends to start monitoring PDCCH (because for example the wireless device 300 expects to receive DL data e.g. from a network server). For example, the wireless device 300 can indicate in the PUR data transmission, that the wireless device 300 expects an additional downlink response and thus, the wireless device 300 intends to monitor the downlink control channel (e.g. PDCCH) even if the wireless device 300 may not use one or more future PUR allocations for uplink transmissions. For example, when the wireless device 300 does not transmit UL data in the PUR occasions. In one or more embodiments, the wireless device 300 is configured to monitor PDCCH even when no uplink transmission has been performed. For example, the PDCCH monitoring may take place in the same cycle or occasion as PUR or in another occasion. In one or more example methods, the DL data indicator comprises an approval indicator to confirm to the wireless device the monitoring of PDCCH. For example, the approval indicator may indicate to the wireless device an acceptance by the radio network node of the UL data indicator comprising indicator that the wireless device intends to monitor PDCCH. In FIG. 7C, the wireless device 300 does not transmit UL data in the second PUR occasion, there is no need for the wireless device 300 to monitor ACK/NACK, however the wireless device 300 is monitors PDCCH at 500 even when no uplink transmission has been performed because the wireless device 300 has transmitted in 502 an UL data indicator indicating monitoring of PDCCH by the wireless device 300 and/or because the wireless device 300 has received in 502A the DL data indicator comprising an approval indicator to confirm to the wireless device the monitoring of PDCCH. For example, the PDCCH monitoring may take place in the same cycle or occasion as PUR or in another occasion 552 where the radio network node 400 transmits a DL grant 554.

Embodiments of methods and products (radio network node and wireless device) according to the disclosure are set out in the following items:

1. A method, performed in a wireless device, for enabling communication of additional data in connection with a pre-allocated uplink, UL, data transmission, the method comprising:
   communicating (S102), between the wireless device and a radio network node, using one or more resources associated with the pre-allocated uplink data transmission, a data indicator indicating that the additional data is to be communicated; and
   communicating (S104) the additional data, between the wireless device and the radio network node, based on the communicated data indicator.
2. The method according to item 1, wherein the data indicator is included in a pre-allocated data transmission or in an acknowledgement of a pre-allocated data transmission.
3. The method according to any of the previous items, wherein communicating (S102) the data indicator comprises sending (S102A) to the radio network node an uplink, UL, data indicator indicating that the wireless device has additional uplink data to transmit.
4. The method according to any of the previous items, wherein the data indicator comprises a downlink, DL, data indicator indicative of one or more resources for transmission of the additional data, and/or a semi-persistent scheduling, SPS, indicator.
5. The method according to item 4, wherein the DL data indicator comprises an UL grant indicative of the one or more resources for transmission of the additional data, and/or the semi-persistent scheduling, SPS, indicator.
6. The method according to any of the previous items, wherein the one or more resources comprise one or more pre-allocated uplink resources, PUR.
7. The method according to item 6, wherein sending (S102A) to the radio network node the UL data indicator indicating that the wireless device has additional uplink data to transmit comprises transmitting (S102AA) the UL data indicator to the radio network node using at least one of the pre-allocated uplink resources.
8. The method according to any of items 6-7, the method comprising:
   determining (S101) that additional data is to be communicated to the radio network node in addition to data allocated to the pre-allocated uplink resources.
9. The method according to any of the previous items, wherein communicating (S102) the data indicator comprises receiving (S102B) from the radio network node the downlink, DL, data indicator indicating that the radio network node has downlink data to transmit to the wireless device.
10. The method according to item 9, wherein the data indicator comprises the DL data indicator indicative of one or more resources for reception of the additional data and/or a radio resource control, RRC, connection setup request.
11. The method according to any of items 4-10, wherein the DL data indicator is configured to request the wireless device to monitor a Physical Downlink Control Channel, PDCCH.
12. A method, performed in a radio network node, for supporting communication of additional data in connection with a pre-allocated uplink, UL, data transmission, wherein the radio network node is configured to communicate with a wireless device, the method comprising:
   communicating (S202), between the wireless device and the radio network node, using one or more resources associated with the pre-allocated uplink data transmission, a data indicator indicating that the additional data is to be communicated;
   allocating (S204) one or more resources for communication of the additional data based on the data indicator; and
   communicating (S206), between the wireless device and the radio network node, the additional data based on the data indicator and the allocated one or more resources.
13. The method according to item 12, wherein the data indicator is included in a pre-allocated data transmission from the wireless device or in an acknowledgement of a pre-allocated data transmission to the wireless device.
14. The method according to any of items 12-13, wherein communicating (S202) the data indicator comprises receiving (S202A) from the wireless device an uplink, UL, data indicator indicating that the wireless device has additional uplink data to transmit.
15. The method according to items 14, wherein the data indicator comprises a DL data indicator indicative of one or more resources for transmission of the additional data, and/or a semi-persistent scheduling, SPS, indicator.
16. The method according to any of items 12-15, wherein communicating (S202) the data indicator comprises transmitting (S202B) to the wireless device a downlink, DL, data indicator indicating that the radio network node has downlink data to transmit to the wireless device.

17. The method according to item 16, wherein the DL data indicator is indicative of one or more resources for reception of the additional data and/or a radio resource control, RRC, connection setup request.

18. The method according to any of items 14-17, wherein the uplink, UL, data indicator comprises an indicator that the wireless device intends to monitor PDCCH.

19. The method according to any of items 16-18, wherein the DL data indicator comprises an approval indicator to confirm to the wireless device the monitoring of PDCCH.

The use of the terms "first", "second", "third" and "fourth", "primary", "secondary", "tertiary" etc. does not imply any particular order, but are included to identify individual elements. Moreover, the use of the terms "first", "second", "third" and "fourth", "primary", "secondary", "tertiary" etc. does not denote any order or importance, but rather the terms "first", "second", "third" and "fourth", "primary", "secondary", "tertiary" etc. are used to distinguish one element from another. Note that the words "first", "second", "third" and "fourth", "primary", "secondary", "tertiary" etc. are used here and elsewhere for labelling purposes only and are not intended to denote any specific spatial or temporal ordering. Furthermore, the labelling of a first element does not imply the presence of a second element and vice versa.

It may be appreciated that FIGS. 1-7C comprises some modules or operations which are illustrated with a solid line and some modules or operations which are illustrated with a dashed line. The modules or operations which are comprised in a solid line are modules or operations which are comprised in the broadest example embodiment. The modules or operations which are comprised in a dashed line are example embodiments which may be comprised in, or a part of, or are further modules or operations which may be taken in addition to the modules or operations of the solid line example embodiments. It should be appreciated that these operations need not be performed in order presented. Furthermore, it should be appreciated that not all of the operations need to be performed. The exemplary operations may be performed in any order and in any combination.

It is to be noted that the word "comprising" does not necessarily exclude the presence of other elements or steps than those listed.

It is to be noted that the words "a" or "an" preceding an element do not exclude the presence of a plurality of such elements.

It should further be noted that any reference signs do not limit the scope of the claims, that the exemplary embodiments may be implemented at least in part by means of both hardware and software, and that several "means", "units" or "devices" may be represented by the same item of hardware.

The various exemplary methods, devices, nodes and systems described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform specified tasks or implement specific abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

Although features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications, and equivalents.

The invention claimed is:

1. A method, performed in a wireless device, enabling additional uplink (UL) data to be communicated between the wireless device and a radio network node in addition to uplink (UL) data communicated between the wireless device and the radio network node in connection with a pre-allocated uplink (UL) data transmission, the method comprising:
   communicating, to the radio network node while the wireless device is in a Radio Resource Control (RRC) idle state and using one or more pre-allocated uplink resources (PURs) associated with the pre-allocated UL data transmission, a data indicator indicating that the additional UL data is to be communicated, wherein the data indicator comprises an UL data indicator;
   receiving from the radio network node an acknowledgement of the communicating of the data indicator comprising the UL data indicator, the acknowledgement comprising a semi-persistent scheduling (SPS) indicator;
   entering a RRC connected state with the radio network node from the RRC idle state without performing a random access procedure based on the data indicator comprising the UL data indicator and the receiving of the acknowledgement comprising the SPS indicator; and
   communicating the additional UL data to the radio network node in the RRC connected state entered into from the RRC idle state without performing the random access procedure based on the data indicator comprising the UL data indicator and the SPS indicator in the acknowledgement.

2. The method according to claim 1, further comprising: including the data indicator in the pre-allocated UL data transmission or in an acknowledgement of the pre-allocated UL data transmission.

3. The method according to claim 1, wherein the communicating the data indicator comprises sending to the radio network node an uplink (UL) data indicator indicating that the wireless device has additional uplink data to transmit.

4. The method according to claim 1, wherein the communicating the data indicator comprises receiving a downlink (DL) data indicator indicative of one or more resources for transmission of the additional UL data.

5. The method according to claim 4, wherein the receiving the DL data indicator comprises receiving an UL grant indicative of the one or more resources for transmission of the additional UL data; and/or the semi-persistent scheduling (SPS) indicator.

6. The method according to claim 1, wherein sending to the radio network node the UL data indicator indicating that the wireless device has additional uplink data to transmit comprises transmitting the UL data indicator to the radio network node using at least one of the one or more PURs.

7. The method according to claim 1, further comprising: determining that additional UL data is to be communicated to the radio network node in addition to data allocated to the one or more PURs.

8. The method according to claim 1, wherein the communicating the data indicator comprises receiving from the radio network node a downlink (DL) data indicator indicating that the radio network node has downlink data to transmit to the wireless device.

9. The method according to claim 8, wherein the receiving the data indicator comprises receiving a DL data indicator indicative of one or more resources for reception of the additional UL data and/or a RRC connection setup request.

10. The method according to claim 4, wherein the receiving the DL data indicator comprises receiving a DL indicator configured to request the wireless device to monitor a Physical Downlink Control Channel (PDCCH).

11. A method, performed in a radio network node, for supporting communication of additional uplink (UL) data to be communicated between the radio network node and a wireless device in addition to uplink (UL) data communicated between the radio network node and the wireless device in connection with a pre-allocated uplink (UL) data transmission, wherein the radio network node is configured to communicate with the wireless device, the method comprising:
receiving, from the wireless device, using one or more pre-allocated uplink resources (PURs) associated with the pre-allocated UL data transmission, a data indicator indicating that the additional UL data is to be communicated, wherein the data indicator comprises an UL data indicator;
communicating to the wireless device an acknowledgement of receiving of the data indicator comprising the UL data indicator, the acknowledgement comprising a semi-persist scheduling (SPS) indicator, the acknowledgement causing the wireless device to enter a Radio Resource Control (RRC) connected state from an RRC idle state without performing a random access procedure based on the data indicator comprising the UL data indicator and the acknowledgement comprising the SPS indicator; and
receiving the additional UL data from the wireless device using the allocated one or more resources in the RRC connected state entered into by the wireless device from the RRC idle state without performing the random access procedure based on the data indicator comprising the UL data indicator and the SPS indicator in the acknowledgement.

12. The method according to claim 11, wherein the receiving the data indicator comprises receiving a data indicator included in a pre-allocated data transmission from the wireless device or in an acknowledgement of a pre-allocated data transmission to the wireless device.

13. The method according to claim 11, wherein the communicating the data indicator comprises receiving from the wireless device an uplink (UL) data indicator indicating that the wireless device has additional uplink data to transmit.

14. The method according to claim 13, wherein the receiving the data indicator comprises receiving a DL data indicator indicative of one or more resources for transmission of the additional UL data.

15. The method according to claim 11, wherein the communicating the data indicator comprises transmitting to the wireless device a downlink (DL) data indicator indicating that the radio network node has downlink data to transmit to the wireless device.

16. The method according to claim 15, wherein the transmitting the DL data indicator comprises transmitting a DL indicator indicative of one or more resources for reception of the additional UL data and/or a RRC connection setup request.

17. The method according to claim 13, wherein the receiving the UL data indicator comprises receiving an indicator that the wireless device intends to monitor a Physical Downlink Control Channel (PDCCH).

18. The method according to claim 15, wherein the transmitting the DL data indicator comprises transmitting an approval indicator to confirm to the wireless device a monitoring of a Physical Downlink Control Channel (PDCCH).

19. A wireless device comprising:
a memory module;
a processor module; and
a wireless interface,
wherein the wireless device is configured to enable additional uplink (UL) data to be communicated between the wireless device and a radio network node, in addition to UL data communicated between the wireless device and the radio network node in connection with a pre-allocated uplink (UL) data transmission, by:
communicating a data indicator to the radio network node while the wireless device is in a Radio Resource Control (RRC) idle state and using one or more pre-allocated uplink resources (PURs) associated with the pre-allocated UL data transmission, wherein the data indicator indicates that the additional UL data is to be communicated, wherein the data indicator comprises an UL data indicator;
receiving from the radio network node an acknowledgement of the communicating of the data indicator comprising the UL data indicator, the acknowledgement comprising a semi-persistent scheduling (SPS) indicator;
entering a RRC connected state with the radio network node from the RRC idle state without performing a random access procedure based on the data indicator comprising the UL data indicator and the receiving of the acknowledgement comprising the SPS indicator; and
communicating the additional UL data to the radio network node using the one or more PURs associated with the pre-allocated UL data transmission comprising the one or more PURs and in the RRC connected state entered into from the RRC idle state without performing a random access procedure to enter a RRC connected state based on the UL data indicator comprising the UL data indicator and the SPS indicator in the acknowledgement.

* * * * *